2,491,094

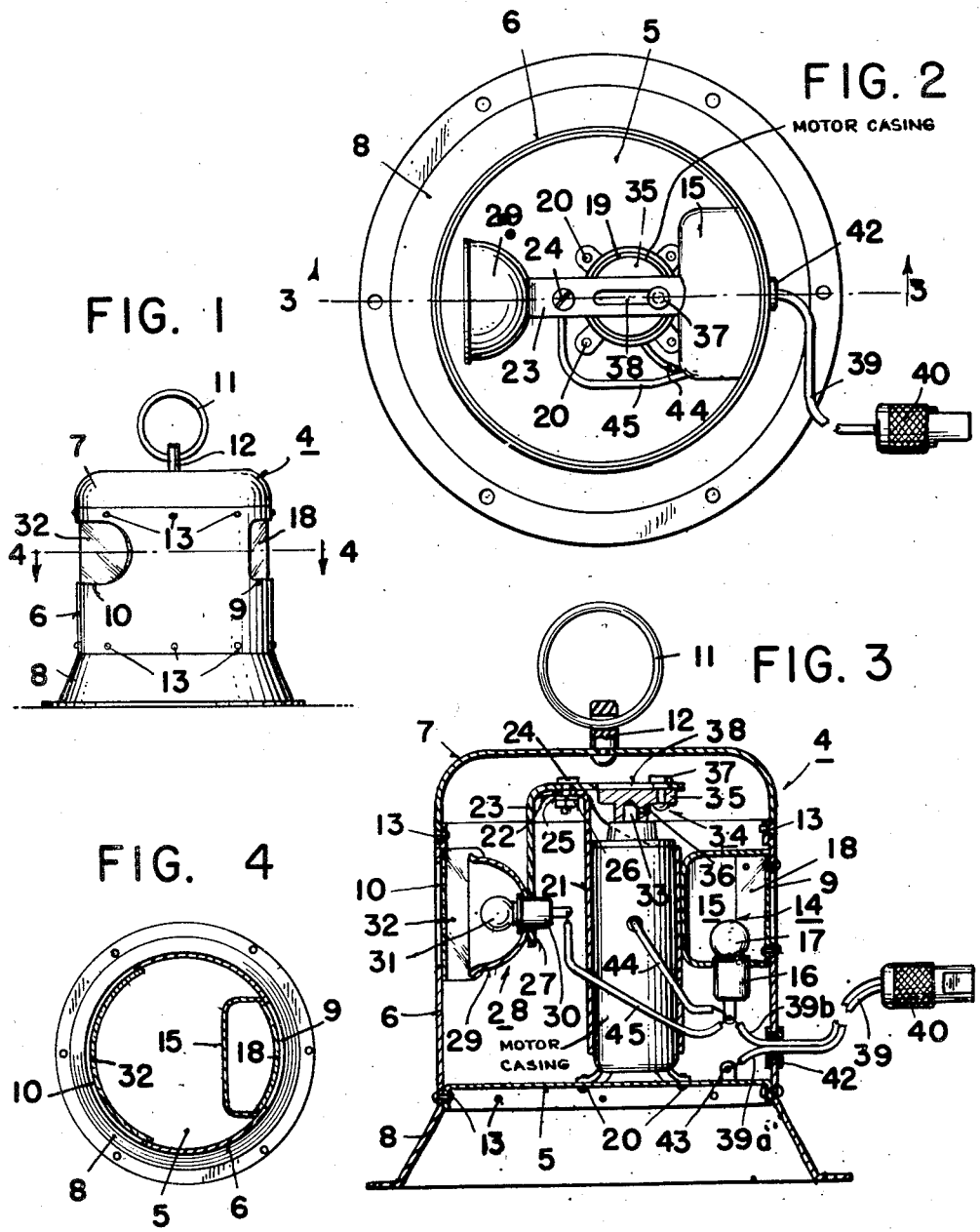
Dec. 13, 1949 — L. E. DU FRANE — 2,491,094
WARNING AND FLOODLIGHT FOR MOTOR VEHICLES
Filed Sept. 2, 1947
Inventor
L. E. DU FRANE, Patented Dec. 13, 1949

UNITED STATES PATENT OFFICE 2,491,094

WARNING AND FLOOD LIGHT FOR MOTOR VEHICLES

Lawrence E. Du Frane, Fond du Lac, Wis.

Application September 2, 1947, Serial No. 771,665

3 Claims. (Cl. 177—329)

This invention relates to illuminating devices, and more particularly to a device which is adapted for use with a motor vehicle when it is desired to supply illumination in order to effect temporary repairs at night on a highway or at roadside and at the same time provide a warning to overtaking vehicles.

Therefore an object of the invention is to provide a portable device which will supply illumination for making repairs to a motor vehicle and also exhibit a moving warning light to catch the attention of overtaking vehicles, which device may be supplied with electric current from the battery of the motor vehicle.

The above features and the additional advantages which characterize the illuminating device of this invention will be described in detail and claimed in the following specification and claims and the apparatus is illustrated in the accompanying drawings, in which:

Fig. 1 is a side view of the illuminating device of this invention;

Fig. 2 is a plan view of the device with the cover of the housing removed;

Fig. 3 is a cross-section taken on the line 3—3 of Fig. 2; and

Fig. 4 is a cross-sectional view taken on the line 4—4 of Fig. 1, showing the width of the opening in the casing for the oscillating light.

In the drawing the housing for the device is indicated generally by the reference numeral 4, and comprises a base 5, a body portion 6 and a cover 7. In the preferred form of the invention the base 5 is circular and provided with a downwardly extending skirt portion 8 constituting a support. The body portion 6 may be cylindrical in shape and is provided with openings 9 and 10 for purposes which will be later explained. The cover 7 may be provided with a handle for carrying, such as the ring 11 and eye-bolt 12. The various portions of the housing may be joined together by fasteners 13, such as rivets, bolts, or sheet metal screws.

Within the housing 4 there is fixedly mounted an illuminating lamp generally indicated by numeral 14. This comprises a reflector 15 provided with a socket 16 suitable for a light bulb 17 which may be of the type operable from a motor vehicle battery. Reflector 15 is suitably attached to the body portion 6 so that the rays from bulb 17 will be directed outwardly through the opening 9. The opening may also be covered by a lens 18 of transparent glass or plastic. The lens may be clear and it may also be shaped so as to provide light-directing qualities. In the preferred embodiment of the invention the various portions of the housing 4, as well as the reflector 15 are made of metal. Therefore the socket 16 and the light bulb 17 may be of the "single-wire" type, but it will be understood that the "double-wire" type may be substituted.

A casing 19 for an electric motor is attached to the base 5 by means of fasteners 20, and extending upwardly from the motor casing 19 is a support 21 which may be formed of sheet metal. The upper end of the support 21 is bent at right angles to form a bearing plate 22 which supports the arm 23. A pivotal connection between the arm 23 and the bearing plate 22 is provided by a bolt 24, secured by a washer 25 and a nut 26. It is understood that other connecting means may be substituted, such as a rivet. One end of the arm 23 is bent downwardly as at 27 at which point it supports a warning lamp generally indicated by numeral 28, which comprises a reflector 29, a socket 30 and a light bulb 31. In the preferred embodiment of the invention the various components such as the reflector 29, the arm 23, the support 21, the motor casing 19, and the base 5 are constructed of metal so that the bulb 31 and the socket 30 may be of the "single wire" type, but it will be understood that the "double-wire" type may be substituted. The light bulb 31 is preferably of the type which may be operated from the battery of a motor vehicle and may be colored red as an indication of the presence of danger. The warning lamp assembly 28 is positioned so that light rays from the reflector 29 will be directed outwardly through the opening 10. If desired, a lens of transparent glass or plastic 32 may be fitted in the opening 10, or, if the light bulb 31 is clear, then the lens 32 may be colored to serve as an indication of warning.

Within the motor casing 19 there is supported an electric motor (not shown) which may be coupled to a suitable reduction gear (not shown) which terminates in a rotating shaft 33 whose axis of rotation is substantially parallel to the pivotal axis of the arm 23. The electric motor may be of any type operable from the battery of a motor vehicle but the construction of the electric motor and the reduction gear is well known and purely conventional, and forms no part of this invention.

A crank, generally indicated by the numeral 34, is secured to the rotating shaft 33, and comprises a circular disc 35 provided with an aperture on its under side to receive the shaft 33 and a fastening means, such as set-screw 36 to prevent rotation with respect to the shaft. Extending upwardly from the disc 35 is a pin 37 which is offset with respect to the axis of rotation of the disc. The pin 37 engages a guide provided on arm 23, which in the embodiment shown comprises a longitudinally extending slot 38. This guide, however, might be formed in other ways, not shown, such as by downwardly extending the sides of the arm 23. It will be apparent, therefore, that rotation of the shaft 33 will produce oscillatory movement of the arm 23 by means of the crank 34.

Current supply for operation of the device is provided by flexible wiring 39 supplied with a suitable terminal such as the plug 40 which may be plugged into a light socket or cigarette lighter usually found on motor vehicles. However, the terminal may consist of a pair of clips of a conventional type for making connections directly to a motor vehicle battery. Wiring 39 may enter the housing 4 at any suitable point, protected by a grommet 42 of rubber or other similar material. One conductor 39a of wiring 39 is connected to a "ground" such as the lug 43, while the other conductor 39b leads to the "high" side of the socket 16, and thence to the "high" side of the electric motor, and the socket 30, through conductors 44, and 45, respectively.

I claim:

1. A portable illuminating and warning device for motor vehicles comprising a housing having a substantially upright wall with two openings therein located at opposite sides thereof and through which light rays may pass outwardly, an illuminating lamp fixedly mounted in said housing and adapted to project light rays through one of said openings, an arm supported on a vertical axis in said housing for laterally oscillatory movement in a horizontal plane, a warning lamp mounted on said arm, an electric motor, means enabling said motor to impart oscillatory movement to said arm, and flexible wiring provided with a terminal for attachment to a battery connection to supply current to said motor and said lamps.

2. A portable illuminating and warning device for motor vehicles comprising a housing having a substantially upright wall with two openings therein located at opposite sides thereof and through which light rays may pass outwardly, an illuminating lamp fixedly mounted in said housing and adapted to project light rays through one of said openings, an arm supported on a vertical axis in said housing for laterally oscillatory movement in a horizontal plane, a warning lamp mounted on said arm so as to face in a direction generally opposite to that of said illuminating lamp and adapted to project light rays through the other of said two openings, said arm being provided with a longitudinally extending guide, a rotatable crank and having a crank pin extending vertically and engaging said guide to impart oscillatory movement to said arm, an electric motor, means operatively connecting said motor to said crank, and flexible wiring provided with a terminal for attachment to a battery connection to supply current to said motor and said lamps.

3. A portable illuminating and warning device for motor vehicles comprising a housing having a substantially upright wall with two openings therein located at opposite sides thereof and through which light rays may pass outwardly, an illuminating lamp fixedly mounted in said housing and adapted to project light rays through one of said openings, an arm supported on a vertical axis in said housing for oscillatory movement in a horizontal plane, a warning lamp mounted on said arm so as to face in a direction generally opposite to that of said illuminating lamp and adapted to project light rays through the other of said two openings, said arm being provided with a longitudinally extending guide, a crank mounted in said housing and having a crank pin extending vertically for rotation about an axis substantially parallel to the axis of movement of said arm, said crank engaging said guide so as to impart oscillatory movement to said arm in a horizontal plane, an electric motor, means operatively connecting said motor to said crank, and flexible wiring provided with a terminal for attachment to a battery connection to supply current to said motor and said lamps.

LAWRENCE E. DU FRANE.

REFERENCES CITED

The following references are of record in the file of this patent:

UNITED STATES PATENTS

| Number | Name | Date |
|---|---|---|
| 2,025,638 | Bohnet | Dec. 24, 1935 |
| 2,035,841 | Signor | Mar. 31, 1936 |
| 2,165,562 | Macket et al. | July 11, 1939 |
| 2,224,742 | Muldoon | Dec. 10, 1940 |